US010623608B2

(12) United States Patent
Li et al.

(10) Patent No.: US 10,623,608 B2
(45) Date of Patent: Apr. 14, 2020

(54) ENHANCE HIGHLIGHTER COLOR IN SCANNED IMAGES

(71) Applicant: Hewlett-Packard Development Company, L.P., Houston, TX (US)

(72) Inventors: Lixia Li, Boise, ID (US); Mark Shaw, Meridian, ID (US); Jerry Wagner, Boise, ID (US); Craig T Johnson, San Diego, CA (US); Di-Yuan Tzeng, Eagle, ID (US); George Henry Kerby, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 83 days.

(21) Appl. No.: 15/558,936

(22) PCT Filed: Jun. 26, 2015

(86) PCT No.: PCT/US2015/038066
§ 371 (c)(1),
(2) Date: Sep. 15, 2017

(87) PCT Pub. No.: WO2016/209277
PCT Pub. Date: Dec. 29, 2016

(65) Prior Publication Data
US 2018/0084156 A1    Mar. 22, 2018

(51) Int. Cl.
*H04N 1/62* (2006.01)
*H04N 1/60* (2006.01)
*H04N 1/48* (2006.01)

(52) U.S. Cl.
CPC .......... *H04N 1/626* (2013.01); *H04N 1/484* (2013.01); *H04N 1/6019* (2013.01); *H04N 1/6027* (2013.01); *H04N 2201/0081* (2013.01)

(58) Field of Classification Search
USPC ............... 358/1.1–3.29, 1.11–1.18, 504–522
See application file for complete search history.

(56) References Cited

U.S. PATENT DOCUMENTS

| | | | |
|---|---|---|---|
| 5,668,636 | A | 9/1997 | Beach et al. |
| 5,744,795 | A | 4/1998 | Bianchi et al. |
| 5,764,796 | A | 6/1998 | Smith |
| 6,081,343 | A | 6/2000 | Terashita |
| 6,356,654 | B1 | 3/2002 | Loce et al. |
| 6,665,434 | B1 | 12/2003 | Yamaguchi |
| 7,860,339 | B2 * | 12/2010 | Yamashita .............. G06T 5/004 345/600 |

(Continued)

FOREIGN PATENT DOCUMENTS

| | | |
|---|---|---|
| JP | 2005-236919 A | 9/2005 |
| JP | 2008-271386 A | 11/2008 |

(Continued)

OTHER PUBLICATIONS

Sachs, Jonathan ~ "Color Balancing Techniques", Copyright 1996-1999 Digital Light & Color ~ 13 pages.

*Primary Examiner* — Marcellus J Augustin
(74) *Attorney, Agent, or Firm* — HP Inc. Patent Department

(57) ABSTRACT

Examples herein involve retrieving a color transformation from a highlighter color transform, and processing an image using the color transformation to enhance highlighter colors in the image, the image scanned by a scanner using strobed illumination.

19 Claims, 5 Drawing Sheets

(56) References Cited

U.S. PATENT DOCUMENTS

| | | | | |
|---|---|---|---|---|
| 2002/0110376 A1* | 8/2002 | MacLean | ............... | G03B 17/48 |
| | | | | 396/429 |
| 2004/0208359 A1* | 10/2004 | Pishva | .................. | G06T 15/506 |
| | | | | 382/162 |
| 2005/0190288 A1* | 9/2005 | Yamada | ............... | H04N 5/2354 |
| | | | | 348/371 |
| 2015/0043046 A1* | 2/2015 | Iwamoto | ............ | H04N 1/40012 |
| | | | | 358/515 |
| 2015/0226743 A1* | 8/2015 | Weiss | ............... | G01N 33/57407 |
| | | | | 424/133.1 |
| 2016/0014301 A1* | 1/2016 | Wang | ................... | H04N 1/4074 |
| | | | | 358/464 |
| 2016/0187199 A1* | 6/2016 | Brunk | .................... | G01J 3/2823 |
| | | | | 348/89 |
| 2018/0262769 A1* | 9/2018 | Su | ......................... | H04N 19/30 |

FOREIGN PATENT DOCUMENTS

JP            2013-012800 A     1/2013
KR           10-0119506 B1     10/1997

\* cited by examiner

ENHANCE HIGHLIGHTER COLOR IN SCANNED IMAGES

BACKGROUND

Scanners convert physical media (e.g., documents, images, objects, etc.) into digital media. Many scanners, such as Contact Image Sensor (CIS) scanners or Telecentric Array Reflective Optics (TAROT) scanners, use strobed illumination (e.g., via a strobed red-green-blue (RGB) light source). For example, these scanners may include a red light emitting diode (LED), a green LED, and a blue LED to scan the physical media. Such scanners may capture reflections of light from the RGB light source off objects (e.g., text, images, etc.) on the physical media substrate (e.g., paper, cardboard, etc.) and record reflected colors received from the objects as the digital media.

BRIEF DESCRIPTION OF THE DRAWINGS

Wherever possible, the same reference numbers will be used throughout the drawing(s) and accompanying written description to refer to the same or like parts.

DETAILED DESCRIPTION

Examples disclosed herein involve enhancing highlighter colors in scanned images using a color transformation. In examples herein, highlighter colors (e.g., yellow, orange, pink, etc.) scanned using strobed illumination (e.g., a scanner with a strobed red-green-blue (RGB) light source) may be enhanced (e.g., increase color contrast relative to a background) using a color transformation of the image. The example color transformation may be stored in a color transform (e.g., a color transform table, a color transform matrix, a color transform calculator, etc.) for enhancing highlighter colors in the scanned image. In some examples, a highlighter mode may be enabled when a scanner scans media that includes highlighted content or disabled when the scanner scans media that does not include highlighted content.

Due to the fluorescence of highlighter colors, in many instances, the appearance of highlighter colors in scanned media may be faded or nearly non-existent (at least to the human eye) when using strobed illumination and monochromatic sensors. The fluorescence of the highlighter colors may reflect with an intensity that appears brighter than paper white (e.g., paper white, i.e., a main/background color of the media or of a document), and thus may be clipped by subsequent image processing resulting in a loss of information in a reproduction of the scanned image. Examples herein provide an ability to enhance highlighter color(s) in images that are scanned using strobed illumination using a color transformation that enhances corresponding highlighter colors) detected in the scanned images.

An example method includes retrieving a color transformation from a highlighter color transform, and processing an image using the color transformation to enhance highlighter colors in the image scanned by a scanner using a strobed illumination. An example apparatus includes a mode analyzer to determine a mode to process an image scanned by a scanner with a strobed illumination source, a non-highlighter transformer to process the image using a non-highlighter color transform when the mode is a non-highlighter mode, and a highlighter transformer to process the image using a highlighter color transform different from the non-highlighter color transform when the mode comprises a highlighter mode, the highlighter color transform to provide a color transformation to enhance highlighter content in the image.

Figure 1:
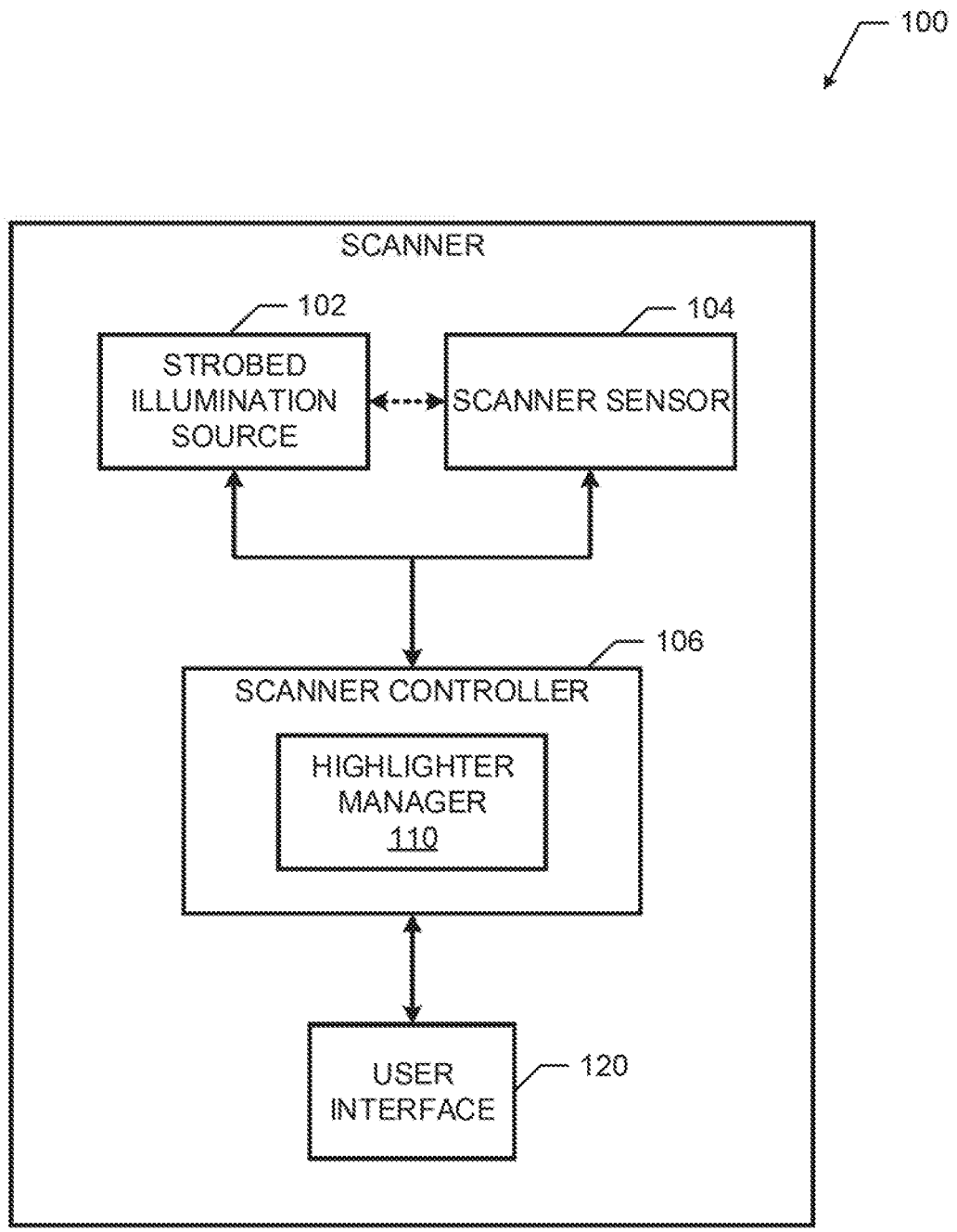
FIG. 1 is a schematic diagram of an example scanner including a highlighter manager that may be implemented in accordance with an aspect of this disclosure.

FIG. 1 is a schematic diagram of an example scanner 100 including a highlighter manager 110 that may be implemented in accordance with an aspect of this disclosure. The scanner 100 of FIG. 1 may be a Contact Image Sensor (CIS) scanner, Telecentric Array Reflective Optics (TAROT) scanner, an optical reduction (or lens reduction) scanner, or any other similar scanner that utilizes strobed illumination and/or monochromatic sensors.

The example scanner 100 of FIG. 1 includes a strobed illumination source 102, a scanner sensor 104, a scanner controller 106, including the highlighter manager 110, and a user interface 120. In the illustrated example of FIG. 1, the scanner controller 106 controls the strobed illumination source 102 to emit strobed light toward media (e.g., documents, images, etc.) using a strobed light source (e.g., a strobed RGB light source). The example scanner sensor 104 may capture or measure an intensity of the strobed light reflected off the media and generate corresponding image data. The measured reflected light is caused by the emitted light from the strobed illumination source 102 (as indicated by the dotted line in FIG. 1). In examples herein, the scanner controller 106 processes the image data from the scanner sensor 104 using the highlighter manager 110 in accordance with aspects of this disclosure.

The example strobed illumination source 102 of FIG. 1 may be any light source implemented by strobed illumination. Accordingly, the strobed illumination source 102 may sequentially cycle through a series of colors (e.g., red-green-blue (RGB), cyan-magenta-yellow (CMY), orange-green-violet (OGV), etc.) at a certain rate when the scanner 100 is scanning media. For example, a strobed RGB light source may sequentially emit red light, green light, blue light, red light, green light, blue light, etc. The example scanner sensor 104 of FIG. 1 may be a monochromatic sensor used in accordance with the strobed illumination source 102. Accordingly, the scanner sensor 104 measures an intensity of light reflected from objects of the media and attributes that intensity to a corresponding light color (e.g., red, green, blue of a strobed RGB light source, etc.) of the light source that was emitted by the strobed illumination source 102. More specifically, when the strobed illumination source 102 emits red light, the scanner sensor 104 measures an intensity of light reflected from the media and attributes that intensity to the red channel; when the strobed illumination source 102 emits green light, the scanner sensor 104 measures an intensity of light reflected from the media and attributes that to the green channel; when the strobed illumination source 102 emits blue light, the scanner sensor 104 measures an intensity of light reflected from the media and attributes that to the blue channel, etc. The example scanner sensor 104 provides the corresponding light intensity measurements to the scanner controller 106 and highlighter manager 110 as image data. The image data generated by scanner sensor 104 may be processed in accordance with examples herein for storage, presentation, printing, etc. in accordance with the examples herein.

The example scanner controller 106 controls functions, settings, modes, etc. of the scanner 100. The example scanner controller 106 of FIG. 1 may receive instructions from a user via the user interface 120 to control the scanner 100. For example, the user interface 120 may receive user input instructing the scanner to scan an image, to process a scanned image (e.g., to enhance highlights, etc. The example user interface 120 may be implemented by any input device(s) (e.g., a keyboard, a mouse, a touchscreen, a trackball, a microphone, etc.) and/or output device(s) (e.g., a display, a touchscreen, a speaker, a printer, a multi-function printer, a copier, etc.). In examples herein, the highlighter manager 110 of the scanner controller 106 may process image data to enhance the appearance of highlighter colors (e.g., yellow, orange, pink, etc.) in media. In some examples, the user interface 120 may be implemented by a host device (e.g., a personal computer, a tablet computer, a mobile device (e.g., a smartphone), a server, etc.). Accordingly, in such an example, the scanner 100 may communicate with the host device and/or be controlled by the host device.

In examples herein, after the highlighter manager 110 processes images scanned using the strobed illumination source 102 and the scanner sensor 104 (e.g., a monochromatic sensor), the highlighter manager 110 may forward the processed scanned images to the user interface 120 and/or another device (e.g., a host device, a printer, a server, etc.) in communication with the scanner 100. Accordingly, using examples herein, media that includes highlighter colors (e.g., a document or image including highlighted text) may be enhanced for display, printing, rendering. etc. despite being scanned using the strobed illumination source 102 and/or the corresponding scanner sensor 104 (e.g., a monochromatic sensor).

While an example manner of implementing the scanner controller 106 is illustrated in FIG. 1, at least one of the elements, processes and/or devices illustrated in FIG. 1 may be combined, divided, re-arranged, omitted, eliminated and/or implemented in any other way. Further, the example scanner controller 106 of FIG. 1 may be implemented by hardware and/or any combination of hardware and executable instructions (e.g., software and/or firmware). Thus, for example, the example scanner controller 106 may be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, the scanner controller 106, including the highlighter manager 110, is hereby expressly defined to include a tangible computer readable storage device or storage disk such as a memory, a digital versatile disk (DVD), a compact disk (CD), a Blu-ray disk, etc. storing the executable instructions. Further still, the example scanner controller 106 of FIG. 1 may include at least one element, process, and/or device in addition to, or instead of, those illustrated in FIG. 1, and/or may include more than one of any or all of the illustrated elements, processes and devices.

Figure 2:
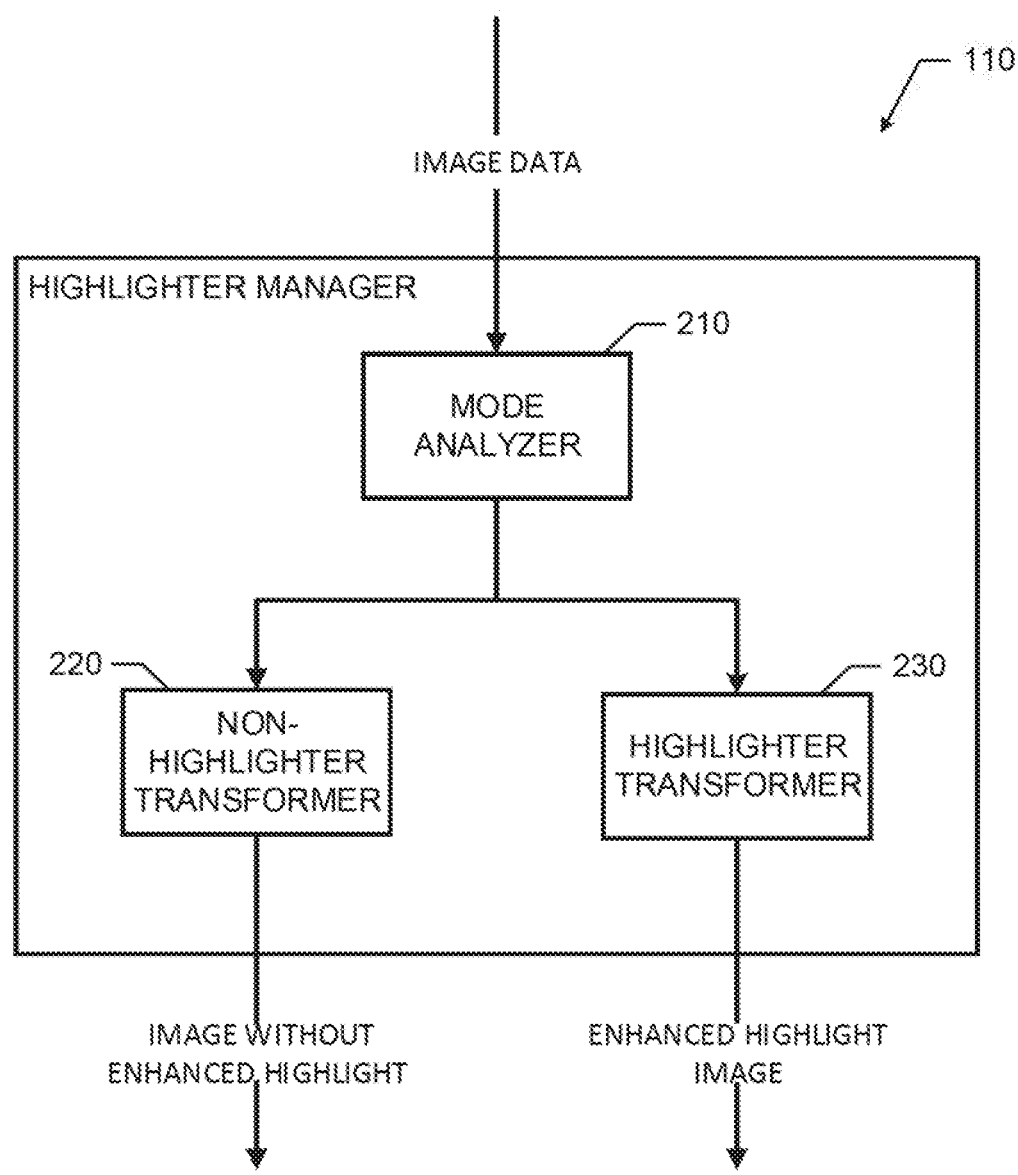
FIG. 2 is a block diagram of an example highlighter manager that may be used to implement the highlighter manager of the scanner system of FIG. 1.

FIG. 2 is a block diagram of an example highlighter manager 110 that may be implemented by the highlighter manager 110 of FIG. 2. The example highlighter manager 110 of FIG. 2 includes a mode analyzer 210, a non-highlighter transformer 220, and a highlighter transformer 230. In examples herein, the mode analyzer 210 determines a mode of the scanner 100, and provides image data (e.g., data from the scanner sensor 104) to the non-highlighter transformer 220 and/or the highlighter transformer 230 based on the determined mode.

The example mode analyzer 210 of FIG. 2 determines a mode for processing image data using a highlighter mode or a non-highlighter mode. The example image data may be the image data received from the scanner sensor 104 of FIG. 1 or image data received from a separate scanner, host device, etc. For example, when the mode analyzer 210 determines that the highlighter manager 110 is in highlighter mode, the mode analyzer notifies the highlighter transformer to provide (e.g., present, print, forward, etc.) an image with enhanced highlighter colors, and when the scanner 100 is in non-highlighter mode, the mode analyzer 210 notifies the non-highlighter transformer 220 to provide the image without enhanced highlighter colors.

In some examples, the mode analyzer 210 of FIG. 2 may store or retrieve mode information of the highlighter manager 110. For example, the mode analyzer 210 may retrieve (e.g., through a prompt) or receive instructions from a user via the user interface 120 (or a host device in communication with the scanner 100) to place the highlighter manager 110 in highlighter mode or non-highlighter mode. More specifically, in response to determining that an image is to be scanned (e.g., detecting the scanner has been powered on, activated, placed in scan mode, etc.), the mode analyzer 210 may request instructions regarding whether highlighter colors are to be enhanced in the scanned image. In some examples, in response to receiving a user input via the user interface 120, the mode analyzer 210 may instruct the non-highlighter transformer 220 or the highlighter transformer 230 to process image data from the scanner sensor 104. Additionally or alternatively, the mode analyzer 210 may retrieve or store a default setting (e.g., highlighter mode or non-highlighter mode) of the highlighter manager 110 to determine the mode of the highlighter manager 110.

Furthermore, in some examples, the mode analyzer 210 may analyze the image data to determine an appropriate mode that the highlighter manager 110 is to process the image data. For example, the mode analyzer 210 may screen the image data for colors corresponding to highlighter colors in the image data and determine that a highlighter mode is to be set for the highlighter manager 110. More specifically, the mode analyzer 210 may identify an intensity of a color or content in the image data that satisfies a threshold indicating the presence of highlighted content, and thus set the mode of the highlighter manager 110 to highlighter mode. On the other hand, the mode analyzer 210 may determine a lack of highlighter colors in the screened image data and determine that the highlighter manager 110 is to be set to non-highlighter mode.

The example non-highlighter transformer 220 processes image data scanned by the scanner 100 without enhancing highlighter colors in the image data. Accordingly, the non-highlighter transformer 220 may use any suitable means to process image data without enhancing highlighter colors in the image. For example, the non-highlight transformer 220 may use a standard color transform table (e.g., an International Consortium on Color (ICC) color standard table, etc.) a standard image processor that does not enhance designated colors (e.g., highlighter colors) to convert the image data to an image or object that may be rendered by the user interface 120 (or a host device in communication with the scanner 100). Accordingly, the non-highlight transformer 220 may provide an image without enhanced highlighter colors.

The example highlighter transformer 230 of FIG. 2 processes image data of an image to enhance highlighter colors in the image. For example, the highlighter transformer 230 may access or utilize a color transformation to enhance highlighter colors (e.g., yellow, orange, pink, etc.) in the scanned image. The example color transformation may indicate color adjustments, such as a change in intensity, a change in lightness, chroma, and hue, etc. The example color transformation may be accessed from a color transform table, a color transform matrix, a color transform calculation, etc.

In examples, herein, the example highlighter transformer 230 may identify areas, objects, content, etc. in the image having a color intensity (e.g., a triplet RGB intensity) measured within threshold regions corresponding to highlighter colors. The highlighter transformer 230 may convert the identified areas, object, content, etc. having the threshold intensities to another threshold intensity (e.g., a triplet RGB intensity that enhances the highlighter color). As mentioned above, due to the fluorescence of the highlighter colors (e.g., yellow, orange, pink, etc.), the identified color intensities of the highlighter colors in the image data from the scanner sensor 104 may appear in some cases brighter than white, faded, and/or color-shifted in an image prior to the highlighter transformer 230 enhancing the highlighter colors to appear as a desirable highlighter color to the human eye in the processed image. It is noted that, the highlighter transformer 230 may only enhance highlighter colors in the scanned images such that other colors (e.g., black, white, etc.) or objects (e.g., text, images, etc.) are relatively unaffected by the highlighter color transformation. Accordingly, to the human eye, other than the highlighter colors or highlighted content being enhanced by the highlighter transformer 230, in examples herein, the remainder of the colors or non-highlighted content may appear the same as if the scanned image were processed by the non-highlighter transformer 220.

In some examples, the highlighter transformer 230 of FIG. 2 may adjust a single highlighter color (e.g., only yellow, only orange, only pink, etc.) in a scanned image. In such an example, the highlighter transformer 230 may detect the presence of a single highlighter color (e.g., by detecting a single highlighter color intensity in the image), and enhance only that highlighter color in the image. In some example, the highlighter transformer may adjust a plurality of highlighter colors (e.g., yellow, orange, pink, blue, green, red, etc.).

In some examples herein, to identify the highlighter colors in image data, the highlighter transformer 230 may identify paper white in a scanned image as a calibration point. The example highlighter transformer 230 may proportionally adjust an intensity of the image relative to the paper white calibration point such that paper white content in the image is adjusted to a percentage of the paper white calibration point. In such an example, the intensity of the highlighter colors (which may be a higher intensity than paper white) may also be adjusted to a threshold level that enables the highlighter transformer 230 to enhance and/or color-correct the highlighter colors in the scanned images to appear as desirable highlighter colors.

In examples herein, after the non-highlighter transformer 220 and/or the highlighter transformer 230 process images scanned using the strobed illumination source 102 and the scanner sensor 104 (e.g., a monochromatic sensor), the processed scanned images may be forwarded to the user interface 120 and/or another device (e.g., a host device) in communication with the scanner 100.

While an example manner of implementing the highlighter manager 110 of FIG. 1 is illustrated in FIG. 2, at least one of the elements, processes and/or devices illustrated in FIG. 2 may be combined, divided, re-arranged, omitted, eliminated and/or implemented in any other way. Further, the mode analyzer 210, the non-highlighter transformer 220, the highlighter transformer 230, and/or, more generally, the example highlighter manager 110 of FIG. 2 may be implemented by hardware and/or any combination of hardware and executable instructions (e.g., software and/or firmware). Thus, for example, any of the mode analyzer 210, the non-highlighter transformer 220, the highlighter transformer 230, and/or, more generally, the example highlighter manager 110 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the mode analyzer 210, the non-highlighter transformer 220, and/or the highlighter transformer 230 is/are hereby expressly defined to include a tangible computer readable storage device or storage disk such as a memory, a digital versatile disk (DVD), a compact disk (CD), a Blu-ray disk, etc. storing the executable instructions. Further still, the example highlighter manager 110 of FIG. 2 may include at least one element, process, and/or device in addition to, or instead of, those illustrated in FIG. 2, and/or may include more than one of any or all of the illustrated elements, processes and devices.

Figure 3:
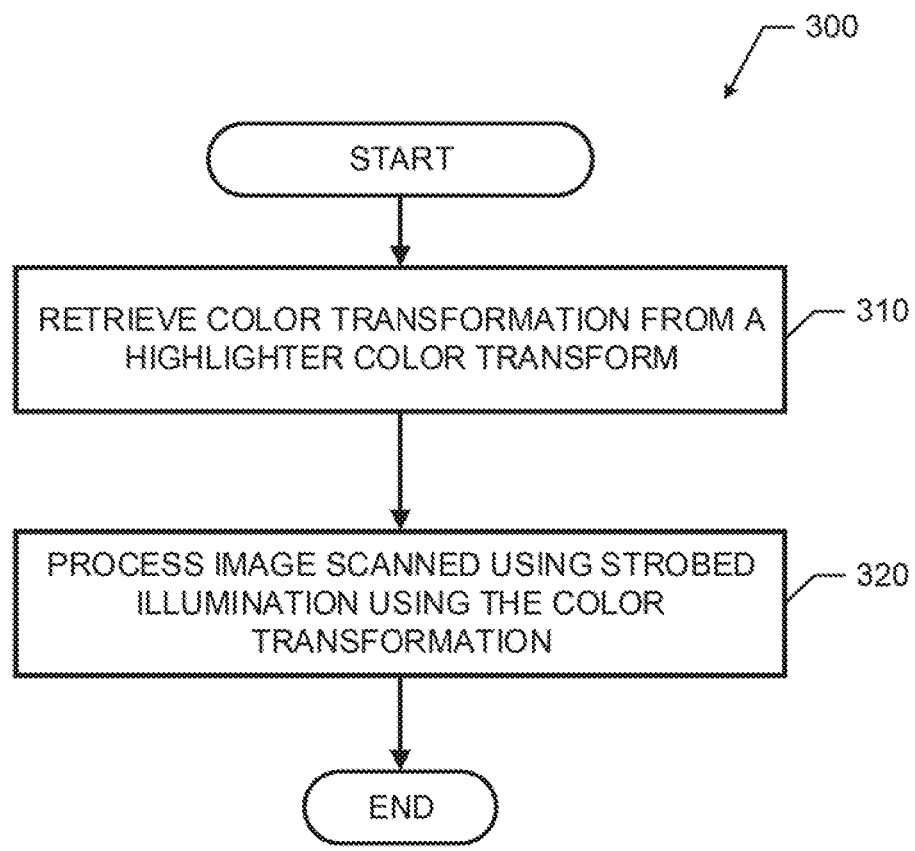
FIG. 3 is a flowchart representative of example machine readable instructions that may be executed to implement the highlighter manager of FIG. 2.

Flowcharts representative of example machine readable instructions for implementing the highlighter manager 110 of FIG. 2 are shown in FIGS. 3 and/or 4. In this example, the machine readable instructions may comprise program(s)/process(es) for execution by a processor such as the processor 512 shown in the example processor platform 500 discussed below in connection with FIG. 5. The program(s)/process(es) may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 512, but the entire program/process and/or parts thereof could alternatively be executed by a device other than the processor 512 and/or embodied in firmware or dedicated hardware. Further, although the example program(s)/process(es) is/are described with reference to the flowchart illustrated in FIGS. 3 and 4, many other methods of implementing the example highlighter manager 110 may alternatively be used. For example, the order of execution of the blocks of FIGS. 3 and/or 4 may be changed, and/or some of the blocks described may be changed, eliminated, or combined.

The example process 300 of FIG. 3 begins with an initiation of the highlighter manager 110 (e.g., upon startup, upon instructions from a user, upon startup of a device implementing the highlighter manager 110 (e.g., the scanner 100), etc.). The example process 300 may be executed to enhance highlighter colors in an image scanned with strobed illumination and/or a monochromatic sensor in accordance with examples herein. At block 310, the example highlighter transform retrieves a color transformation from a highlighter color transform (e.g., a highlighter color transform table, a highlighter color transform matrix, a highlighter color transform calculator, etc.).

At block 320 of FIG. 3, the example highlighter transformer 230 processes an image scanned using strobed illumination using the color transformation. For example, the color transformation may cause enhancement of highlighter colors by adjusting identified highlighter color intensities (e.g., intensities caused by fluorescent highlighter colors, such as yellow, orange, pink, etc.) scanned using strobed illumination and measured using a monochromatic sensor. Accordingly, the highlighter transformer 230 may enhance (e.g., increase the intensity, contrast, etc.) of objects, content, areas, etc. of the image that include the highlighter color(s). Therefore, the image processed by the highlighter transformer 230 is enhanced to more accurately illustrate or present highlighted content.

Figure 4:
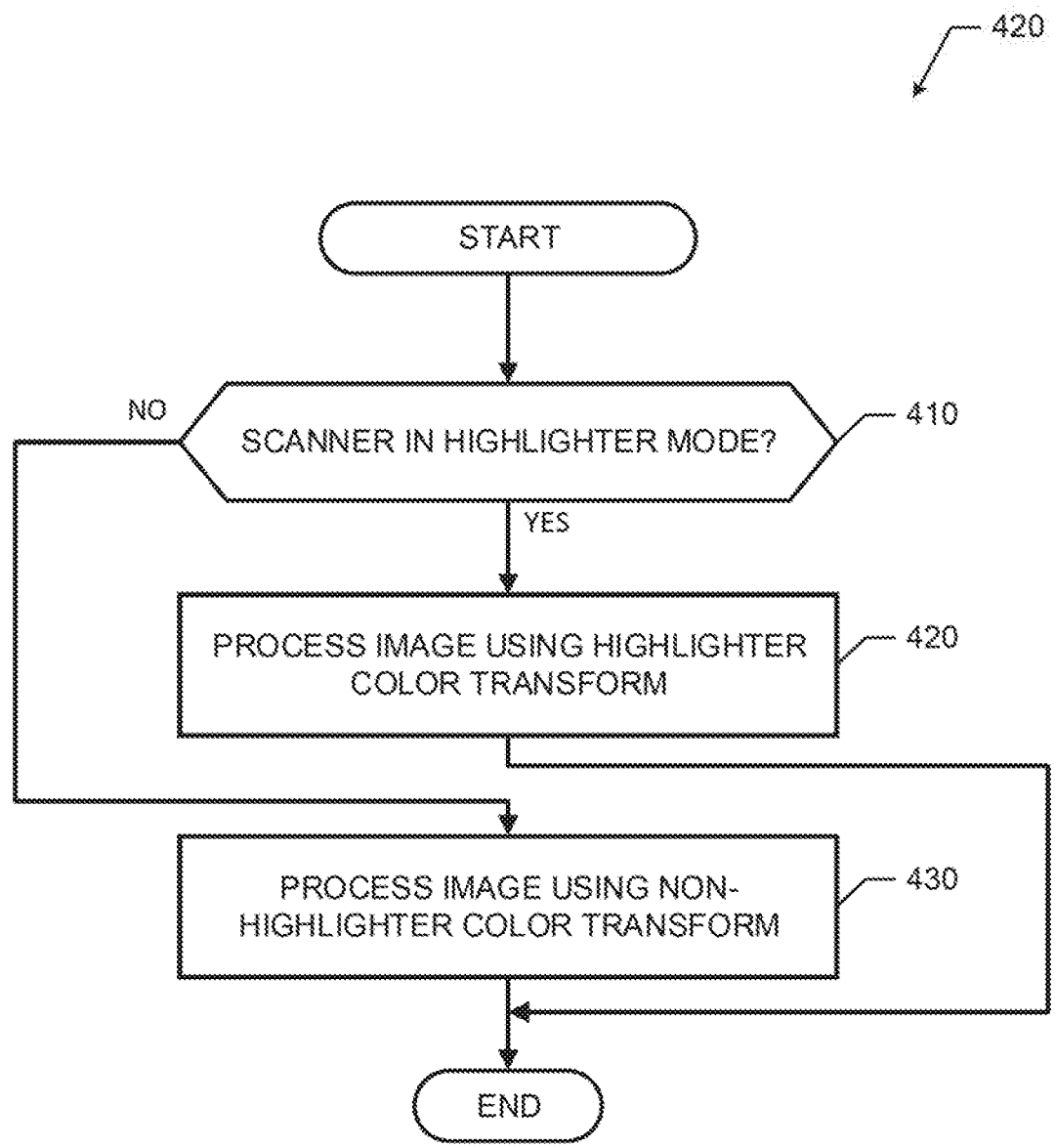
FIG. 4 is another flowchart representative of example machine readable instructions that may be executed to implement the highlighter manager of FIG. 2.

The example process 400 of FIG. 4 begins with an initiation of the highlighter manager 110. The example process 400 may be executed to process image data scanned using strobed illumination and/or a monochromatic sensor to enhance highlighter colors in highlighter mode and to not enhance highlighter colors in non-highlighter mode. At block 410, the mode analyzer 210 determines whether the highlighter manager 110 (and/or scanner 100) is in highlighter mode. For example, at block 410, the mode analyzer 210 determines the mode of the highlighter manager 110. The example mode may be determined based on mode settings of the scanner 100, the scanner controller 106, and/or the highlighter manager 110. In some examples, the mode analyzer 210 may request (e.g., via a prompt, dialog, etc.) or retrieve a mode from a user input via the user interface 120. If, at block 410, the mode analyzer 210 determines that the highlighter manager 110 (or scanner 100) is not in highlighter mode, then control advances to block 530.

If the mode analyzer 210 determines the highlighter manager 110 (or scanner 100) is in highlighter mode (block 410), then, at block 420 of FIG. 4, the highlighter transformer 230 processes the scanned image using highlighter color transform. For example, at block 420, the highlighter transformer may retrieve a color transformation from a color transform table, color transform matrix, or color transform calculator to enhance highlighter colors in the scanned image. At block 430, the non-highlighter transformer 220 processes the scanned image using a non-highlighter color transform (i.e., a color transform that is different from the highlighter color transform). For example, at block 430 the non-highlighter transform may refer to a standard color transformation table (or a standard color transformation matrix, calculator, etc.) to process the scanned image data.

As mentioned above, the example processes of FIGS. 3 and/or 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3 and/or 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 5:
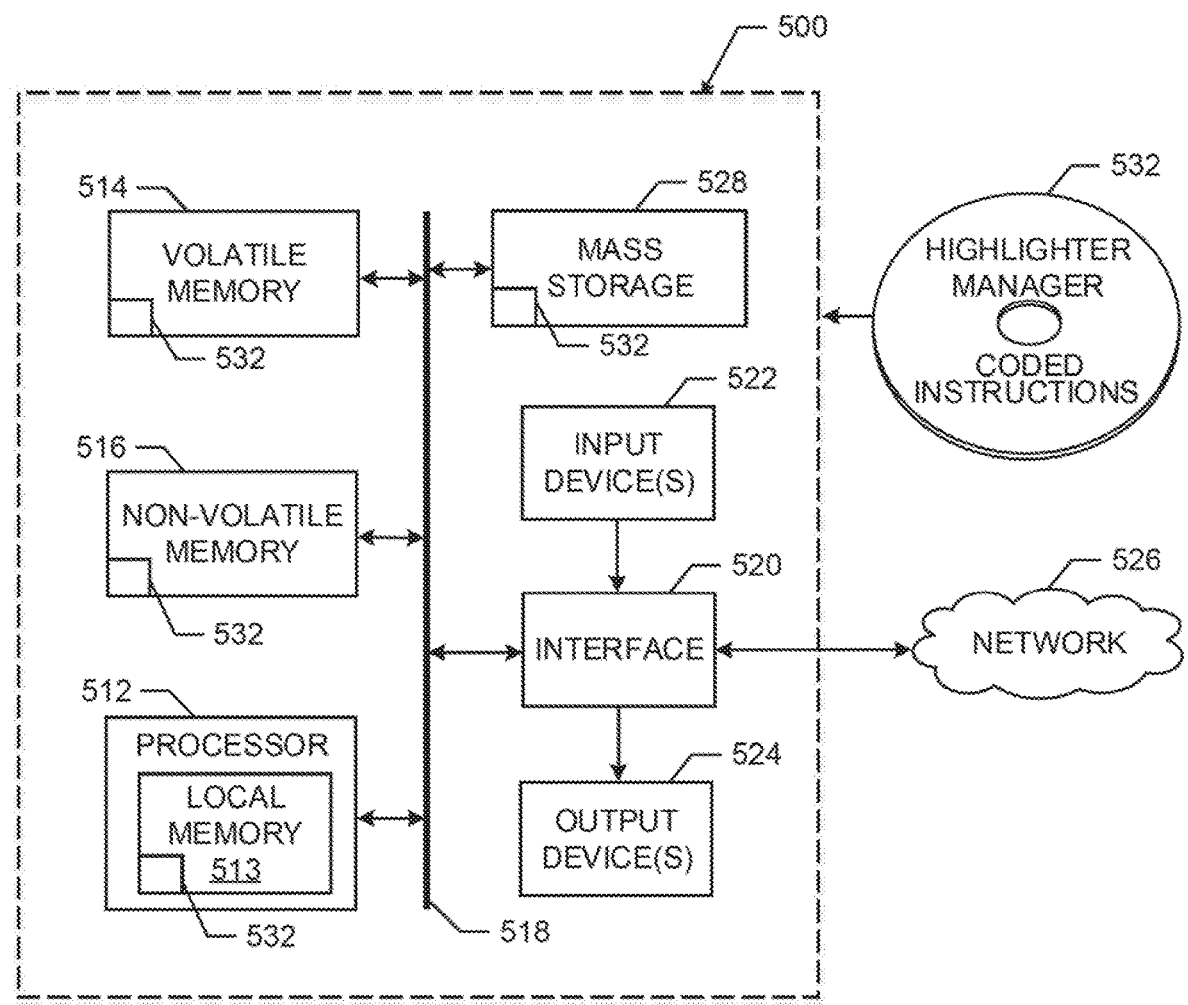
FIG. 5 is a block diagram of an example processor platform capable of executing the instructions of FIGS. 3 and/or 4 to implement the highlighter transformer of FIG. 2.

FIG. 5 is a block diagram of an example processor platform 500 capable of executing the instructions of FIGS. 3 and 4 to implement the highlighter manager 110 of FIG. 2. The example processor platform 500 may be included in any type of apparatus, such as a server, a personal computer, a mobile device (e.g., a cell phone, a smart phone, a tablet, etc.), a personal digital assistant (PDA), an Internet appliance, a printer, multi-function printer, a scanner, a copier, or any other type of computing device.

The processor platform 500 of the illustrated example of FIG. 5 includes a processor 512. The processor 512 of the illustrated example is hardware. For example, the processor 512 can be implemented by at least one integrated circuit, logic circuit, microprocessor or controller from any desired family or manufacturer.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a peripheral component interconnect (PCI) express interface.

In the illustrated example, at least one input device 522 is connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, and/or a voice recognition system.

At least one output device 524 is also connected to the interface circuit 520 of the illustrated example. The output device(s) 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 520 of the illustrated example, thus, may include a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes at least one mass storage device 528 for storing executable instructions (e.g., software) and/or data. Examples of such mass storage device(s) 528 include floppy disk drives, hard drive disks, compact disk drives, Blu-ray disk drives, RAID systems, flash memory, and digital versatile disk (DVD) drives.

The coded instructions 532 of FIGS. 3 and 4 may be stored in the mass storage device 528, in the local memory 513 in the volatile memory 514, in the non-volatile memory 516, and/or on a removable tangible computer readable storage medium such as a CD or DVD.

From the foregoing, it will be appreciated that the above disclosed methods, apparatus and articles of manufacture may enhance highlighter colors in images scanned by scanners using strobed illumination and/or monochromatic sensors (e.g., CIS scanners, TAROT scanners, etc.). Examples herein provide for a color transformation of fluorescent highlighter colors in the scanned images appearing to have a greater intensity than white (or paper white) and/or highlighter colors in the scanned images appearing to have an incorrect color due to the physics and characteristics of the strobed illumination light source and monochromatic sensors of such scanners. The scanned images may be processed using the color transformation such that the appropriate color intensity is applied to highlighter content in the scanned images to enhance the appearance of the highlighter colors in the scanned images.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   retrieving a color transformation from a highlighter color transform; and
   processing an image of media using the color transformation to enhance highlighter colors in the image, the image scanned by a scanner using strobed illumination, wherein the highlighter color transform is used to adjust an intensity of the highlighter colors in the image relative to a calibration point identified in the scanned image according to the color transformation.

2. The method of claim 1, wherein the color transformation enhances highlighter colors in the image of the media by increasing the intensity of the highlighter colors, where the highlighter colors include fluorescent colors on the media.

3. The method of claim 1, further comprising:
   receiving a user input; and
   enhancing the image in response to receiving the user input.

4. The method of claim 3, further comprising:
   receiving a second user input; and
   processing the image using a second color transformation from a color transform for non-highlighted content in response to receiving the second user input.

5. The method of claim 1, further comprising:
   retrieving a mode setting of the scanner; and
   enhancing the image based on the mode setting.

6. The method of claim 1, further comprising:
   identifying the calibration point in the scanned image; and
   prior to processing the image using the color transformation, proportionally adjusting the intensity of the scanned image proportional to a percentage of the calibration point.

7. The method of claim 1, wherein the calibration point is paper white of the media as identified in the scanned image prior to processing the image data.

8. An apparatus comprising:
   a mode analyzer to determine a mode to process an image of media, the image scanned by a scanner that includes a strobed illumination source;
   a non-highlighter transformer to process the image using a non-highlighter color transform when the mode includes a non-highlighter mode; and
   a highlighter transformer to process the image using a highlighter color transform different from the non-highlighter color transform when the mode includes a highlighter mode, the highlighter color transform to provide a color transformation to enhance highlighter content in the image, wherein the highlighter transformer is used to adjust an intensity of the highlighter content in the image relative to a calibration point identified in the scanned image according to the color transformation.

9. The apparatus of claim 8, wherein the strobed illumination source includes a strobed red-green-blue (RGB) light source, a strobed cyan-magenta-yellow (CMY) light source, or a strobed orange-green-violet (OGV) light source, and the strobed illumination source is to cycle through a series of colors while the scanner is scanning the media.

10. The apparatus of claim 8, wherein the scanner includes a monochromatic sensor to capture image data of the image.

11. The apparatus of claim 8, further comprising a user interface to receive a user input indicating the non-highlighter mode or the highlighter mode.

12. The apparatus of claim 8, wherein the calibration point is paper white of the media as identified in the scanned image.

13. The apparatus of claim 8, wherein the intensity of the highlighter content in the image is adjusted proportionally to a percentage of the calibration point in the scanned image.

14. A non-transitory machine readable storage medium comprising instructions that, when executed, cause a machine to at least:
   determine a mode of a scanner, the scanner including a monochromatic sensor to scan an image of media;
   process image data corresponding to the image using a highlighter color transform to enhance highlighter colors in the image when the mode is determined to be a highlighter mode, wherein the highlighter color transform is used to adjust an intensity of the highlighter colors in the image relative to a calibration point identified in the scanned image; and processing image data corresponding to the image using a non-highlighter color transform without enhancing highlighter colors when the mode is determined to be a non-highlighter mode.

15. The non-transitory machine readable storage medium of claim 14, wherein the instructions, when executed, further cause the machine to:

retrieve the highlighter color transform from a color transform table, the color transform table to indicate color adjustments for highlighter content in the scanned image.

16. The non-transitory machine readable storage medium of claim 14, wherein the image data is generated by the monochromatic sensor capturing strobed illumination reflected from the image.

17. The non-transitory machine readable storage medium of claim 14, wherein the instructions, when executed, further cause the machine to:

prompt a user for a user input indicating the mode; and
determine the mode based on the user input.

18. The non-transitory machine readable storage medium of claim 14, wherein the calibration point is paper white of the media as identified in the scanned image.

19. The non-transitory machine readable storage medium of claim 14, wherein the intensity of the highlighter colors in the image is adjusted proportionally to a percentage of the calibration point in the scanned image.

\* \* \* \* \*